(12) United States Patent
Martin

(10) Patent No.: US 9,691,291 B2
(45) Date of Patent: Jun. 27, 2017

(54) SYSTEM AND METHOD FOR PROVIDING GROUP LEARNING VIA COMPUTERIZED STUDENT GROUP ASSIGNMENTS CONDUCTED BASED ON STUDENT ATTRIBUTES AND STUDENT-VARIABLE-RELATED CRITERIA

(71) Applicant: Scriyb LLC, Fairfax Station, VA (US)

(72) Inventor: Scott Mckay Martin, Fairfax Station, VA (US)

(73) Assignee: Scriyb LLC, Manassas, VA (US)

( * ) Notice: Subject to any disclaimer, the term of this patent is extended or adjusted under 35 U.S.C. 154(b) by 12 days.

(21) Appl. No.: 14/658,997

(22) Filed: Mar. 16, 2015

(65) Prior Publication Data
US 2016/0275803 A1    Sep. 22, 2016

(51) Int. Cl.
G09B 5/00    (2006.01)
G09B 5/06    (2006.01)
G09B 7/077   (2006.01)

(52) U.S. Cl.
CPC .............. G09B 5/06 (2013.01); G09B 7/077 (2013.01)

(58) Field of Classification Search
CPC . G09B 7/00; G09B 7/07; G09B 7/077; G09B 5/06; G06Q 10/107
USPC ........................................................ 434/350
See application file for complete search history.

(56) References Cited

U.S. PATENT DOCUMENTS

| 7,092,821 | B2 | 8/2006 | Mizrahi et al. ................... 702/1 |
| 8,244,669 | B2 * | 8/2012 | Ellis et al. ..................... 707/609 |
| 8,300,557 | B2 | 10/2012 | Sekaran et al. ............... 370/260 |
| 8,417,581 | B2 | 4/2013 | Ajjarapu et al. ............. 705/26.1 |
| 8,435,038 | B2 * | 5/2013 | Wilson ..................... G09B 5/06 434/219 |
| 8,549,076 | B2 | 10/2013 | Mizrahi et al. ............... 709/205 |
| 8,725,058 | B2 * | 5/2014 | Bijou ............................. 434/350 |
| 2004/0103118 | A1 * | 5/2004 | Irving et al. ............... 707/104.1 |
| 2004/0161728 | A1 | 8/2004 | Benevento, II et al. ..... 434/118 |
| 2004/0191744 | A1 | 9/2004 | Guirguis ....................... 434/322 |
| 2006/0246412 | A1 | 11/2006 | Pieczenik ..................... 434/350 |
| 2007/0299710 | A1 | 12/2007 | Haveliwala ...................... 705/8 |
| 2007/0300165 | A1 | 12/2007 | Haveliwala ................... 715/758 |
| 2008/0014569 | A1 | 1/2008 | Holiday et al. .............. 434/351 |
| 2008/0294720 | A1 | 11/2008 | Facemire et al. ............ 709/204 |
| 2009/0325138 | A1 | 12/2009 | Shuster ........................ 434/350 |

(Continued)

*Primary Examiner* — Peter Egloff

(74) *Attorney, Agent, or Firm* — Sheppard Mullin Richter & Hampton LLP

(57) ABSTRACT

In certain implementations, group learning may be provided via computerized student group assignments. In an implementation, student information about students registered to take a course may be obtained. The student information may comprise attributes of the students that correspond to student variables. Group criteria information associated with the course may be obtained. The group criteria information may comprise first criteria indicating that a student group is to be diverse with respect to a first variable, and second criteria indicating that a student group is to be similar with respect to a second variable. The students may be assigned to student groups associated with the course based on the attributes, the first criteria, and the second criteria such that a student group associated with the course comprises a set of students that, as a whole, is diverse with respect to the first variable and similar with respect to the second variable.

17 Claims, 9 Drawing Sheets

(56) References Cited

U.S. PATENT DOCUMENTS

| | | | |
|---|---|---|---|
| 2011/0136094 A1 | 6/2011 | Weiler | 434/362 |
| 2011/0244953 A1 | 10/2011 | Pekau et al. | 463/29 |
| 2012/0182384 A1 | 7/2012 | Anderson et al. | 348/14.09 |
| 2012/0317220 A1* | 12/2012 | Atchison et al. | 709/206 |
| 2013/0004929 A1 | 1/2013 | Otwell | 434/350 |
| 2013/0189664 A1 | 7/2013 | Lee et al. | 434/308 |
| 2013/0204942 A1* | 8/2013 | Agarwal | H04L 65/403 709/204 |
| 2013/0226645 A1 | 8/2013 | Renaghan | 705/7.19 |
| 2013/0252223 A1 | 9/2013 | Jadcherla | 434/350 |
| 2013/0309648 A1* | 11/2013 | Park et al. | 434/350 |
| 2013/0316322 A1* | 11/2013 | Roschelle | G09B 7/00 434/350 |
| 2014/0272849 A1* | 9/2014 | Bhatia et al. | 434/237 |
| 2014/0315178 A1* | 10/2014 | Ngiam et al. | 434/350 |
| 2014/0335497 A1 | 11/2014 | Gal | |
| 2015/0279225 A1 | 10/2015 | Barber | |

* cited by examiner

*200*

**\*Required fields**

| | |
|---|---|
| \*First name: | |
| \*Last name: | |
| \*Email: | |
| \*Confirm Email: | |
| \*Password:<br>(minimum six characters) | |
| \*Confirm Password: | |
| \*Country | United States |
| \*Street Address 1: | 1000 Generic Lane |
| \*Street Address 2: | |
| \*City: | Vienna |
| \*State/Province: | VA |
| \*Zip Code: | 22181 |
| \*Phone: | |
| \*Gender: | |
| \*Date of Birth: | January 1 1900 |
| Race (optional) | |
| Current School | |
| Grade Level | |
| Major (if applicable) | |
| Highest GPA | |
| Graduation Year | |
| Profession | |
| Interests and Activities | |
| Hobbies | |
| Languages | |
| Favorite City | |
| Favorite Vacation Spot | |

By creating a student account, the student is agreeing to terms & conditions and privacy policy (listed below):

Privacy Policy | Terms & Conditions (Submit)

FIG. 2

You are currently viewing classes from the Game & Technology School

| Narrow your options by:<br>Search Term:<br>[search]<br>Category:<br>Development & Design<br>Production<br>Art<br>Programming<br>Writing<br>Cyber<br>Week:<br>Week 1<br>Week 2<br>Week 3<br>Week 4<br>Week 5<br>Age Range:<br>9-12<br>13-Adult<br>13-18<br>14-Adult<br>Registration Status:<br>Open<br>WaitList<br>Closed<br><br>🛒 My Cart(1) | 3-D Game Design: Unity<br>Ages: 14-Adult<br>Scheduled Time: M-F 10:00 am – 4:00 pm (EST)<br>Price: $159.00<br>Description: The recommended prerequisite for this advanced course is the Introduction to Game Design course, or equivalent<br>[View Sections Available]<br><br>C# Game Programming II<br>Ages: 14-Adult<br>Scheduled Time: M-F 10:00 am – 4:00 pm (EST)<br>Price: $159.00<br>Description: Students will expand upon the knowledge and skills learned in the first C# Programming course. The ...<br>[View Sections Available]<br><br>Game Art and Animation I<br>Ages: 14-Adult<br>Scheduled Time: M-F 10:00 am – 4:00 pm (EST)<br>Price: $159.00<br>Description: This course is a prerequisite for Game Art and Animation II. In this course, students will learn the basics of 3D design ...<br>[View Sections Available]<br><br>C# Game Programming I<br>Ages: 14-Adult<br>Scheduled Time: M-F 10:00 am – 4:00 pm (EST)<br>Price: $159.00<br>Description: This course will cover the fundamentals of C# programming. It will be taught in conjunction with the Unity Game Engine, as ...<br>[View Sections Available]<br><br>Internet of Everything (IoE) | 3-D Game Design: Unreal<br>Ages: 14-Adult<br>Scheduled Time: M-F 10:00 am – 4:00 pm (EST)<br>Price: $159.00<br>Description: The recommended prerequisite for this advanced course is the Introduction to Game Design course, or equivalent<br>[View Sections Available]<br><br>C++ Game Programming I<br>Ages: 14-Adult<br>Scheduled Time: M-F 10:00 am – 4:00 pm (EST)<br>Price: $159.00<br>Description: This course will cover the fundamentals of C++ programming. To reinforce learned material, short working programs ...<br>[View Sections Available]<br><br>Game Art and Animation II<br>Ages: 14-Adult<br>Scheduled Time: M-F 10:00 am – 4:00 pm (EST)<br>Price: $159.00<br>Description: Prerequisite: Game Art and Animation I or permission from the instructor in this advanced class, students will build upon ...<br>[View Sections Available]<br><br>Game Production & Management<br>Ages: 14-Adult<br>Scheduled Time: M-F 10:00 am – 4:00 pm (EST)<br>Price: $159.00<br>Description: ... see more<br>[View Sections Available]<br><br>Introduction to Game Design |

FIG. 3

Instructor Registration

─ 600

[ tutorial ]

| First name | _____ |
| Last name | _____ |
| Address | _____ |
| | _____ |
| State | [ ▼ ] |
| Zip | _____ |
| Sex | [ ▼ ] |
| Race (optional) | [ ▼ ] |
| Birth Date | [ ▼ ] |
| Email Address | _____ |
| Mobile Phone | _____ |
| Employment | _____ |
| Education | _____ |
| School or College of Graduation | _____ |
| Year of Graduation | _____ |
| Teaching Experience | _____ |
| Areas of Expertise | _____ |
| Course Name | _____ |
| Course Age Group | [ ▼ ] |
| Course Days | _____ |
| Course Times | _____ Time Zone [ ▼ ] |
| Course Cost | _____ |

[ submit ]

FIG. 6

```
                                                                      ┌─────┐
                                                           Instructor │     │
Home • Course Catalog • My Courses                           account • log out
Create a Course – Teaching Assistant
 [ tutorial ]

Course Title    [ Game 410: Unity ]
                             click to remove
Course Dates   [6/2/2015 ▼]  [6/2/2015][6/4/2015][6/9/2015][6/12/2015]

Course Age Group ─○══○────────────
                 0  14  20         110

Course Cost    [$150.00 ▼]

Course Times   [10:00 am▼] — [4:00 pm ▼]  [EST ▼]

┌─────────────────────────────────────────────────────────┐
               │ Lorem ipsum dolor sit amet, sit ea esse cetero, ea nec   │
               │ habeo aeque nonumy. cripta fuisset argumentum eu eam.    │
               │ No usu cibo principes mnesarchum, no euripidis issentias │
               │ quo. Congue putent numquam no vel, his ei quod saperet   │
               │ apeirian. Modo numquam maiestatis in usu, facer eripuit  │
Course         │ has eu. Vim ex iriure hendrerit. Sed an                  │
Prerequisites  └─────────────────────────────────────────────────────────┘
                       click to remove
               [Lorem ipsum▼] [Lorem ipsum][dolor sit]
Course Software
Requirements   ┌─────────────────────────────────────────────────────────┐
               │ Lorem ipsum dolor sit amet, sit ea esse cetero, ea nec   │
               │ habeo aeque nonumy. cripta                               │
               └─────────────────────────────────────────────────────────┘
Course Hardware
Requirements   ┌─────────────────────────────────────────────────────────┐
               │ Lorem ipsum dolor sit amet, sit ea esse cetero, ea nec   │
               │ habeo aeque nonumy. cripta                               │
               └─────────────────────────────────────────────────────────┘

Syllabus [ upload ]

[ create ]
```

FIG. 7

SYSTEM AND METHOD FOR PROVIDING GROUP LEARNING VIA COMPUTERIZED STUDENT GROUP ASSIGNMENTS CONDUCTED BASED ON STUDENT ATTRIBUTES AND STUDENT-VARIABLE-RELATED CRITERIA

FIELD OF THE INVENTION

The invention relates to providing group learning via computerized student group assignments conducted based on student attributes and student-variable-related criteria.

BACKGROUND OF THE INVENTION

In recent years, with the advent of new technologies, eLearning has become an increasingly popular alternative to traditional classroom instruction and training. Benefits of eLearning may, for example, comprise lower costs and efficient learning as a result of reduced overhead and reoccurring costs, the ability for students to learn at their own pace (as opposed to the pace of the slowest member of their class), the option for students to skip elements of a program that they've already mastered, decreased student commuting time, etc.

However, in an effort to keep costs low, eLearning programs generally have large class sizes, which typically results in less student engagement, and gives the appearance of a lack of attention to individual students. Although some eLearning programs may offer small group learning, the composition of each group may not facilitate effective learning (e.g., if group members are geographically far from one another, if group members do not have backgrounds, skills, or interests that complement or supplement one another, etc.). Courses offered via eLearning programs are also typically managed by an institution, limiting individual instructors (e.g., instructors that are not employed by specific institutions) from creating and managing their own courses. These and other drawbacks exist.

SUMMARY OF THE INVENTION

The invention addressing these and other drawbacks relates to methods, apparatuses, and/or systems for providing group learning via computerized student group assignments conducted based on student attributes and student-variable-related criteria.

In accordance with one aspect of the invention, an electronic learning platform that allows any instructor to create, offer, and teach their own course may be provided. As an example, an instructor need not be limited to those instructors belonging to a specific institution (e.g., such as a university system comprising a set of affiliated universities or other higher education systems) to create, offer, and teach a course via the electronic learning platform. In an implementation, student records, instructor records, or other information on the electronic learning platform may be managed across the electronic learning platform (as opposed to being managed by a specific institution). The records may, for example, be used to match students of current or prior courses to instructors or their courses, to suggest new future courses of interest for instructors to create, offer, and teach, to suggest created courses to students with a potential interest in such courses, or for other purposes—even if the suggested courses will not be taught by instructors of the current or prior courses (or by instructors within a specific institution that offered the current or prior courses).

In an implementation, students may be provided with suggestions for a course for which they can register based on instructor information (comprising attributes of an instructor of the course), course information (comprising attributes of the course), student information (comprising attributes of the students), or other information. As an example, the suggestions may be determined based on a determination of which instructors match the students in their courses of interest or need (e.g., in addition to which available courses match the student's interest).

In an implementation, suggestions to register for a course may be provided to students not registered for the course to supplement a composition of student already registered to take a course. As an example, if the current composition of registered students does not satisfy a preferred composition of students for the course (e.g., user-selected preferred composition, automated selection of the preferred composition, etc.), non-registered students may be provided with such suggestions based on a determination that the addition of those non-registered students to the registered composition would create a composition that satisfies the preferred composition. In one use case, if the current composition is lacking registered students with a particular attribute (e.g., a certain achievement level, a certain race, or other attribute), students that have an interest in the course and have the particular attribute (but have not registered for the course) may be determined. Those students may then be provided with a suggestion to register for the course in an effort to end up with a composition of registered students for the course that satisfies the preferred composition.

In an implementation, students registered to take a course may be assigned to student groups associated with the course based on student information comprising attributes of the students and group criteria information comprising criteria for a student group associated with the course. Individual student groups for the same course may, for example, be limited to a predetermined maximum number of students, and each student group may be "walled off" from the other student groups such that the existence of the other student groups are not indicated to any of the student groups. In this way, although a large number of students may register for the course, a single (or few) instructors may nevertheless teach the course to all of the students without the disadvantages typically associated with large class size (e.g., appearance of a lack of attention to individual students, less student engagement, etc.).

In an implementation, student information (on which the student assignments may be based) may comprise attributes of students, such as the students' names (e.g., first name, last name, etc.), residential/mailing information (e.g., residential/mailing address or zip code), biological information (e.g., sex, age, race, etc.), cultural background information (e.g., race, ethnicity, social economic status, religion, etc.), career information (e.g., current profession or experience, areas of expertise, professional interests, etc.), education information (e.g., current or previous schools attended, current grade level or high grade level completed at the respective schools, graduation years at the respective schools, grade point averages at the respective schools, school majors or degrees received, etc.), personal interest information (e.g., hobbies, favorites, etc.), ability information (e.g., skills, languages known, etc.), legal status information (e.g., military status, marital status, etc.), or other information.

Group criteria information (on which the student assignments may be based) may comprise criteria indicating that a student group associated with a course is to be diverse with respect to a student variable, criteria indicating that a student group associated with a course be similar with respect to a student variable, criteria indicating respective preferred amounts of students (e.g., percentages of students, numbers of students) having certain attributes (for a student variable) to be assigned to a student group associated with a course, or other criteria to be considered when assigning students to student groups associated with a course.

In an implementation, students may be assigned to student groups associated with a course based on attributes of the students, first criteria indicating that a student group associated with the course is to be diverse with respect to a first variable of the students, and second criteria indicating that a student group associated with the course is to be similar with respect a second variable of the students. The student assignment may, for example, be such that each of the student groups comprises a set of students that, as a whole, is diverse with respect to the first variable and similar with respect to the second variable. As an example, the first variable may relate to at least one of residential or mailing information, biological information, cultural background information, career information, education information, personal interest information, ability information, or legal status information, and the second variable may relate to at least another one of the residential or mailing information, the biological information, the cultural background information, the career information, the education information, the personal interest information, the ability information, or the legal status information. Other criteria with respect to other student variables may be utilized for assignment of the students to the student group, for example, to produce student groups (e.g., of 30 or less students, of other sizes, etc.) that are demographically and intellectually balanced, and comprise age, interest, and experienced appropriate, like-minded students.

In an implementation, access to a communication channel (e.g., a chatroom or other communication channel) associated with a student group for a course may be enabled for a student based on the student being assigned to the student group. As an example, responsive to the student being assigned to a particular student group, the student may have access to post messages (e.g., text, multimedia, or other information) on a communication channel associated with the particular student group, view messages posted by others on the communication channel, view a list of participants currently accessing the communication channel, receive automated messages posted on the communication channel, etc. The students may be encouraged (e.g., through automated bot prompts) to communicate with one another via the communication channel before a class session begins, during the class session, or after the class session. As such, peer-to-peer cohort learning may be encouraged and promoted via the communication channel to facilitate learning—as many education and learning studies demonstrate, students can learn as much (or more) from their classmates, as they can from their instructors.

In an implementation, other students that have not been assigned to the particular student group (e.g., but are instead assigned to other student groups) may not be given access to the communication channel. In some implementations, access to view the list of participants currently accessing the communication channel may not be enabled for those other students (that are not assigned to the particular student group). As an example, no indication of the existence of the particular student group may be provided to those other students (e.g., to "wall off" student groups from one another).

In an implementation, access to communication channels associated with student groups for a course may be enabled for an instructor of the course. As an example, the instructor may have the ability to select a set of the student groups (e.g., by selecting the associated set of communication channels) and send a message to the students assigned to the student groups of the selected set (e.g., by providing the message on the communication channels accessible to the students assigned to those student groups). In one use case, the message may be provided on a first communication channel accessible to the students assigned to a first student group (of the selected set) without indicating to the students assigned to the first student group that the message is accessible to the second student group (or other student groups). Similarly, the message may be provided on a second communication channel accessible to the students assigned to the second student group (of the selected set) without indicating to the students assigned to the second student group that the message is accessible to the first student group. In this way, among other benefits, the student groups may remain "walled off" from one another to give the appearance of a small class size while taking advantage of the benefits of a large class.

In an implementation, access to interface windows representing different communication channels may be enabled for students, instructors, or other users. In an implementation, access to multiple interface windows, each of which represent a communication channel associated with a particular student group for a course, that are presented on a user interface may be enabled for an instructor of the course (or other user, e.g., an administrator, a student, etc.). As an example, when a message is provided on a specific one of the communication channels, the message may be provided for presentation on the interface window that represents the specific communication channel.

In an implementation, access to an interface window (e.g., on a chat interface) that represents multiple communication channels, each of which is associated with a particular student group for a course, may be enabled for an instructor of the course (or other user, e.g., an administrator, a student, etc.). The interface window may represent two or more of the communication channels associated with the student groups for the course (e.g., some or all of the student groups for the course). As an example, messages provided on any one of those communication channels may be presented on the interface window. As another example, duplicate messages provided on those communication channels may be presented as only one message on the interface window.

Various other aspects, features, and advantages of the invention will be apparent through the detailed description of the invention and the drawings attached hereto. It is also to be understood that both the foregoing general description and the following detailed description are exemplary and not restrictive of the scope of the invention. As used in the specification and in the claims, the singular forms of "a", "an", and "the" include plural referents unless the context clearly dictates otherwise. In addition, as used in the specification and the claims, the term "or" means "and/or" unless the context clearly dictates otherwise.

BRIEF DESCRIPTION OF THE DRAWINGS

FIG. 2 is an exemplary illustration of a user interface that enables a user to provide information to create a student account, in accordance with an aspect of the invention.

FIG. 3 is an exemplary illustration of a user interface that enables a user to register for a course, in accordance with an aspect of the invention.

FIG. 6 is an exemplary illustration of a user interface that enables a user to provide information to create an instructor account, in accordance with an aspect of the invention.

FIG. 7 is an exemplary illustration of a user interface that enables a user to provide information to create a course, in accordance with an aspect of the invention.

DETAILED DESCRIPTION OF THE INVENTION

In the following description, for the purposes of explanation, numerous specific details are set forth in order to provide a thorough understanding of the implementations of the invention. It will be appreciated, however, by those having skill in the art that the implementations of the invention may be practiced without these specific details or with an equivalent arrangement. In other instances, well-known structures and devices are shown in block diagram form in order to avoid unnecessarily obscuring the implementations of the invention.

Exemplary System Description

Figure 1:
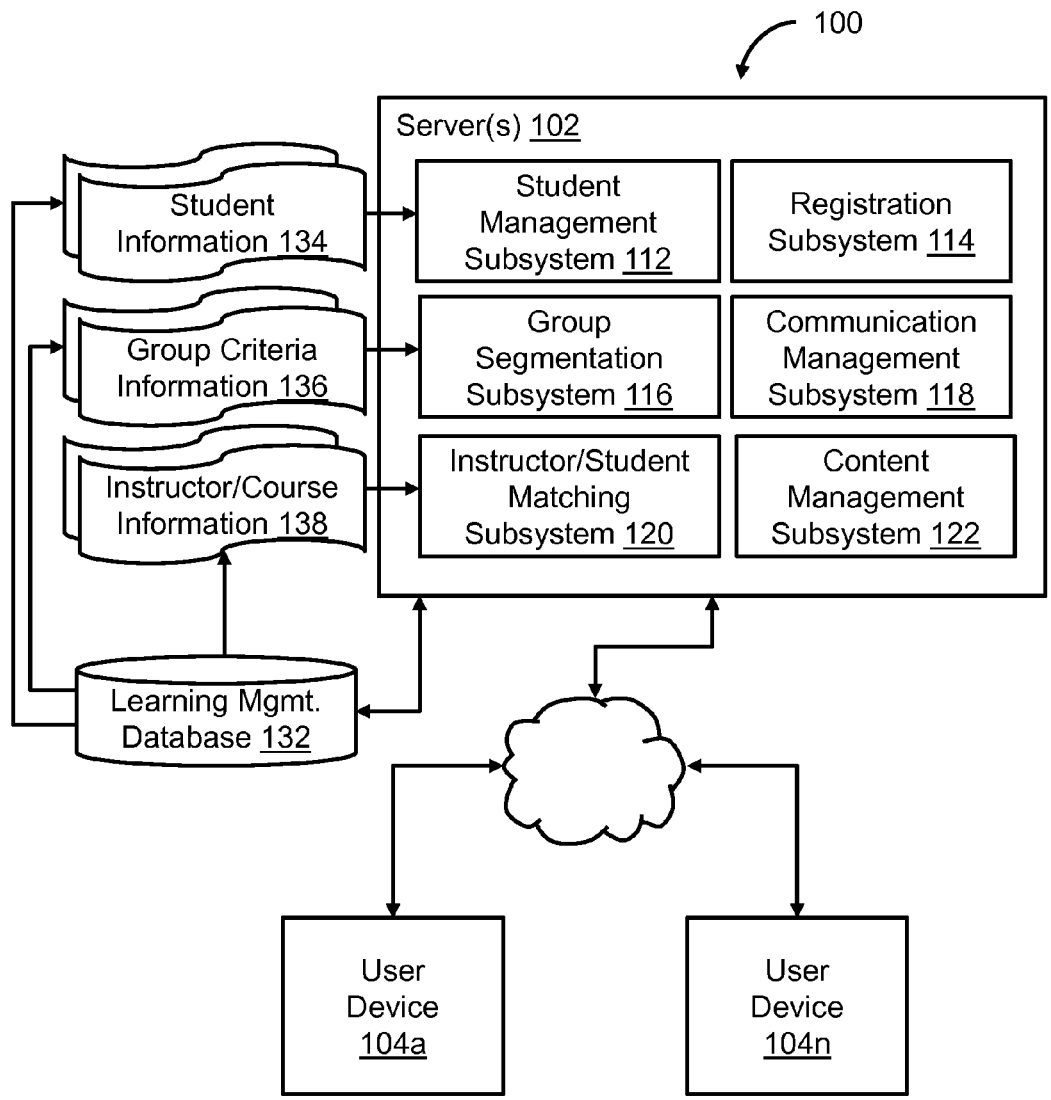
FIG. 1 is an exemplary illustration of a system for providing group learning via computerized student group assignments conducted based on student attributes and student-variable-related criteria, in accordance with an aspect of the invention.

FIG. 1 is an exemplary illustration of a system 100 for providing group learning via computerized student group assignments conducted based on student attributes and student-variable-related criteria, in accordance with an aspect of the invention. As shown in FIG. 1, system 100 may comprise server 102 (or multiple servers 102). Server 102 may comprise student management subsystem 112, registration subsystem 114, group segmentation subsystem 116, communication management subsystem 118, instructor/student matching subsystem 120, content management subsystem 122, or other components.

System 100 may further comprise user device 104 (or multiple user devices 104). User device 104 may comprise any type of mobile terminal, fixed terminal, or other device. By way of example, user device 104 may comprise a desktop computer, a notebook computer, a netbook computer, a tablet computer, a smartphone, a navigation device, an electronic book device, a gaming device, or other user device. Users may, for instance, utilize one or more user devices 104 to interact with server 102 or other components of system 100. It should be noted that, while one or more operations are described herein as being performed by components of server 102, those operations may, in some implementations, be performed by components of user device 104.

In some implementations, the various computers and subsystems illustrated in FIG. 1 may comprise one or more computing devices that are programmed to perform the functions described herein. The computing devices may include one or more electronic storages (e.g., learning management database 132, or other electric storages), one or more physical processors programmed with one or more computer program instructions, and/or other components. The computing devices may include communication lines, or ports to enable the exchange of information with a network or other computing platforms. The computing devices may include a plurality of hardware, software, and/or firmware components operating together to provide the functionality attributed herein to the servers. For example, the computing devices may be implemented by a cloud of computing platforms operating together as the computing devices.

The electronic storages may comprise non-transitory storage media that electronically stores information. The electronic storage media of the electronic storages may include one or both of system storage that is provided integrally (e.g., substantially non-removable) with the servers or removable storage that is removably connectable to the servers via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information received from the servers, information received from client computing platforms, or other information that enables the servers to function as described herein.

The processors may be programmed to provide information processing capabilities in the servers. As such, the processors may include one or more of a digital processor, an analog processor, a digital circuit designed to process information, an analog circuit designed to process information, a state machine, and/or other mechanisms for electronically processing information. In some implementations, the processors may include a plurality of processing units. These processing units may be physically located within the same device, or the processors may represent processing functionality of a plurality of devices operating in coordination. The processors may be programmed to execute computer program instructions to perform functions described herein of subsystems 110-120 or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 110-120 described herein is for illustrative purposes, and is not intended to be limiting, as any of subsystems 110-120 may provide more or less functionality than is described. For example, one or more of subsystems 110-120 may be eliminated, and some or all of its functionality may be provided by other ones of subsystems 110-120. As another example, additional subsystems may be programmed to perform some or all of the functionality attributed herein to one of subsystems 110-120.

Attention will now be turned to a more detailed description of various implementations comprising one or more features related to providing group learning via computerized student group assignments. It should be noted that features described herein may be implemented separately or in combination with one another.

Computerized Student Assignment Based on Student-Variable-Related Criteria

In an implementation, students registered to take a course may be assigned to student groups associated with the course based on student information comprising attributes of the students and group criteria information comprising criteria for a student group associated with the course. Individual student groups for the same course may, for example, be limited to a predetermined maximum number of students (e.g., 30 or less, or other limit), and each student group may be "walled off" from the other student groups such that the existence of the other student groups are not indicated to any of the student groups. In this way, although a large number of students may register for the course, a single (or few) instructors may nevertheless teach the course to all of the students without the disadvantages typically associated with large class size (e.g., appearance of a lack of attention to individual students, less student engagement, etc.).

Student management subsystem 112 may manage student information of students (e.g., current students, past students, etc.), and enable authorized users to view, update, or otherwise access the student information in accordance with permissions granted to the authorized users. Student information may comprise attributes of students, such as the students' names (e.g., first name, last name, etc.), residential/mailing information (e.g., residential/mailing address or zip code), biological information (e.g., sex, age, race, etc.), cultural background information (e.g., race, ethnicity, social economic status, religion, etc.), career information (e.g., current profession or experience, areas of expertise, professional interests, etc.), education information (e.g., current or previous schools attended, current grade level or high grade level completed at the respective schools, graduation years at the respective schools, grade point averages at the respective schools, school majors or degrees received, etc.), personal interest information (e.g., hobbies, favorites, etc.), ability information (e.g., skills, languages known, etc.), legal status information (e.g., military status, marital status, etc.), or other information.

As an example, registration subsystem 114 may initially obtain student information from students during a registration process (e.g., to register as a potential student, to register for a course, etc.). In one use case, with respect to FIG. 2, a user may provide one or more inputs to create a student account with an eLearning platform via user interface 200. The inputs may, for instance, comprise the user's name (e.g., first name, last name, etc.), a desired password, residential/mailing address (e.g., street address, city, state, zip code, country, etc.), contact information (e.g., phone number, email address, etc.), biological information (e.g., sex, birthdate/age, race, etc.), cultural background information (e.g., race, ethnicity, social economic status, religion, etc.), career information (e.g., current profession or experience, areas of expertise, professional interests, etc.), education information (e.g., current or previous schools attended, current grade level or high grade level completed at the respective schools, graduation years at the respective schools, grade point averages at the respective schools, school majors or degrees received, etc.), personal interest information (e.g., hobbies, favorites, etc.), ability information (e.g., skills, languages known, etc.), legal status information (e.g., military status, marital status, etc.), or other information. The student information may then be stored in one or more databases (e.g., learning management database 132).

As another example, registration subsystem 114 may obtain course information associated with one or more courses, provide the course information to users (e.g., potential students, current students, etc.), enable users to register for courses or modify their registered courses, or perform other operations related to registration. In one scenario, with respect to FIG. 3, a user (e.g., a student) may view information about available courses (e.g., course title, class dates/times, instructor's name, course price, course prerequisites, etc.) and register for one or more of the courses via user interface 300. Upon registration and/or payment for a course, the user may be asked (e.g., via a floating window) if the user would like to be reminded of the course at one or more predetermined times before the course begins (e.g., whether the student wants a reminder of the course two weeks, one day, or some other predetermined time before the course begins via text, email, push notification, or other methods of contact).

Group segmentation subsystem 116 may assign students registered to take a course to student groups associated with the course based on student information (e.g., student information 134) comprising attributes of the students and group criteria information (e.g., group criteria information 136) comprising criteria for a student group associated with the course. As an example, student management subsystem 112 may obtain the attributes of the students, and group segmentation subsystem 116 may obtain the criteria for a student group associated with the course. Group segmentation subsystem 116 may then process the attributes of the students and the criteria to assign the students to respective student groups associated with the course.

The criteria (on which the student assignment is based) may comprise user-selected criteria (e.g., criteria selected by an instructor of the course) or system-selected criteria (e.g., criteria defined by a developer). The criteria may comprise criteria indicating that a student group associated with a course is to be diverse with respect to a student variable, criteria indicating that a student group associated with a course be similar with respect to a student variable, criteria indicating respective preferred amounts of students (e.g., percentages of students, numbers of students) having certain attributes (for a student variable) to be assigned to a student group associated with a course, or other criteria. As an example, the criteria may be selected/defined to produce student groups (e.g., of 30 or less students, of other sizes, etc.) that are demographically and intellectually balanced, and comprise age, interest, and experienced appropriate, like-minded students.

In an implementation, criteria (on which student assignment is based) may comprise a first criteria indicating that a student group associated with the course is to be diverse with respect to a first variable of the students, second criteria indicating that a student group associated with the course is to be similar with respect to a second variable of the students, or other criteria. As an example, group segmentation subsystem 116 may assign students to student groups associated with a course based on attributes of the students, the first criteria, and the second criteria such that each of the student groups associated with the course comprises a set of students that, as a whole, is diverse with respect to the first variable and similar with respect to the second variable.

As an example, Table 1 below provides exemplary preferred amounts of students having particular attributes corresponding to a student's achiever status (e.g., high achievers, mid-level achievers, and low achievers statuses determined based on residential information, education information, or other attributes of the students) for a student group associated with a course. The indicated percentages may, for example, represent maximum levels of each student attribute for each student group associated with the course to create student groups that are diverse with respect to the "achiever" variable.

TABLE 1

| Student Attribute | Preferred Percentage of Students Having The Student Attribute in Each Student Group for a Course |
|---|---|
| High Achievers | 30% |
| Mid-level Achievers | 48% |
| Low Achievers | 22% |

In an implementation, one or more attributes of a student may be explicitly provided by the student (e.g., during registration, subsequent account modification, etc.). In another implementation, one or more attributes of a student may be inferred for the student (e.g., inferred attributes determined based on attributes explicitly provided by the student). As an example, residential information provided by a student (e.g., or "private" information) may be "matrixed" with related "public" information (e.g., via public bot lookup) to determine whether the student is to be inferred as a High Achiever, a Mid-level Achiever, or a Low Achiever. Public information related to a student's residential address or zip code may comprise purchase price of the house associated with the address, assessed value of the house, local court house, state delegate or senator information (e.g., who they are, how much they raised, etc.), congressional precinct information, information about nearby public or private schools (e.g., quality rating of schools, types of courses offered at the respective schools, etc.), demographic information (e.g., racial/ethnic demographic, free/reduced lunch demographic, income demographic, etc.), or other information. In one use case, a student may be inferred to be a High Achiever based on the fact that his/her house is associated with a high purchase or assessed price and that the student lives in an area with high quality schools (e.g., based on public quality rating, advanced course offerings, etc.). Other information, such as education information about the student, may also be taken into account to modify the student's achiever status.

In an implementation, user-provided "private" information (e.g., provided by a student) may be matched and matrixed to "public" information as follows in Table 2A below:

TABLE 2A

| Private | Public |
|---|---|
| Residential Address | Location (e.g., Global Position System (GPS) data) |
| | Local Court House |
| | Purchase Price of House Associated with Residential Address |
| | Current Assessed Value of the House |
| | State Delegate and Senators |
| | Congressional Precincts |
| Zip Code | Nearby Public and Private Schools |
| | Demographic Information |
| Sex | County and Precinct Demographics "Matrixed" with Age (e.g., calculated from birthdate) and Education (e.g., Current School, Grade Level, Major, Highest GPA, Graduation Year, etc.) |
| Race | "Matrixed" with Address, Zip Code, Age, and Education |
| Education (e.g., Current School, Grade Level, Major, Highest GPA, Graduation Year, etc.) | School Demographics |
| | Test Scores "Matrixed" with Address |
| | Job Market |
| | Internal Revenue Service (IRS) Salary Ranges "Matrixed" with Age, Address, and Demographic Information |
| Highest Grade Point Average (GPA) | "Matrixed" with Address, Zip Code, Age, and Education |
| Graduation Year | School Ranking |
| | Tuition Rates |
| | Mascot |
| | Sports Teams |
| Birthdate | "Matrixed" with Education, Address, Zip Code, Interests, and Hobbies |
| Email | Service Provider |
| | IP Address (at the time of the student's data input, e.g., during registration or other process) |
| Mobile Phone | Service Provider |
| | Geo-Location |
| Profession | IRS Code and Job Salary Range "Matrixed" with Age, Education, and Address |
| Veteran (Brand, Active, Reserve, Dates, etc.) | "Matrixed" with Address, Zip Code, Age, and Education |
| Professional Interest/Activities | "Matrixed" with Address, Zip Code, Age, and Education |
| Hobbies | "Matrixed" with Address, Zip Code, Age, and Education |
| Languages | "Matrixed" with Address, Zip Code, Age, and Education |

TABLE 2A-continued

| Private | Public |
|---|---|
| Favorite City | "Matrixed" with Profession, Professional Interests/Activities, Address, Zip Code, Age, and Education |
| Favorite Vacation Spot | "Matrixed" with Favorite City, Profession, Professional Interests/Activities, Hobbies, Address, Zip Code, Age, and Education |

As an example, each of the data sets above may be divided into three variable groups: Basic (r), Education (d), and Personal (z) where r comprises Address, Birthdate, Sex, Race, Name, etc., d comprises Education (e.g., School, Grade Level, Major, Highest GPA, Graduation Year, etc.), and z comprises Profession, Professional Interest/Activities, Hobbies, Languages, Favorite City, Favorite Vacation Spot, etc. Based on the three variable groups, distinct variable group IDs (r, d, z) may be associated with each student. These IDs may be compared and matrixed with the IDs of other students that have registered for the same course to determine student assignments to student groups.

As a further example, the r, d, and z variables (or Matrix variables) may be utilized to determine the similarity (or difference) between students. In one use case, factors that may be part of the r-Matrix variable may comprise Address, Birthday, Sex, Race, and Name, and associated weights of the r-Matrix variable factors may comprise A, B, C, D, and E, respectively. Similarity (or difference) between two students (e.g., Student 1 and Student 2) may be calculated as follows in Table 2B below.

TABLE 2B

Dbetween = Distance Between Student 1 and Student 2
Abetween = Age Difference Between Student 1 and Student 2
Csex = 1 if the sex (or gender) of the Student 1 and Student 2 are the same, 0 if the sex is different
Drace = 1 if the race of the Student 1 and Student 2 are the same (e.g., 1 = 100%), 0.5 if partially the same, 0 if no similarity, etc.
Whoareyou = 1 if they are the same person (e.g., same name), 0 if not
Basic_Similarity = A * (1/(Dbetween) + B * (1/(Abetween) + C * (Csex) + D * (Drace) + E * (Whoareyou)

In another use case, factors that may be part of the d-Matrix variable may comprise School, Grade Level, Major, and Highest GPA, and associated weights of the d-Matrix variable factors may comprise F, G, H, and I, respectively. Similarity (or difference) between two students (e.g., Student 1 and Student 2) may be calculated as follows in Table 2C below.

TABLE 2C

WSchool = 1 if Student 1 and Student 2 went/goes to the same school, 0 if not
GLvl = 1 if the grade levels of Student 1 and Student 2 are equal, 0 if not
WMajor = 1 if the majors of Student 1 and Student 2 are the same, 0.5 if in the same school, 0 if neither
MyGPA = GPA of Student 2 − GPA of Student 1
Education_Similarity = F * (1/(WSchool) + G * (1/(Glvl) + H * (WMajor) + I * (1/(MyGPA))

In a further use case, factors that may be part of the z-Matrix variable may comprise Profession, Professional Interest/Activities, Hobbies, Languages, Favorite City, Favorite Vacation Spot, and associated weights of the z-Matrix variable factors may comprise J, K, L, M, N, and O, respectively. Similarity (or difference) between two students (e.g., Student 1 and Student 2) may be calculated as follows in Table 2D below.

TABLE 2D

WProfession = 1 if Student 1 and Student 2 are in the same profession, 0 if not, 0.5 if similar
WInterests = 1 if Student 1 and Student 2 have the same interests, 0 if not, .5 if similar
WHobbies = 1 if Student 1 and Student 2 have the same hobbies, 0 if not, .5 if similar
WLanguage = 1 if Student 1 and Student 2 are fluent in the same language, 0 if not
FCity = 1 if the favorite city of Student 1 and Student 2 are the same, 0 if not, 0.5 if similar
FVS = 1 if the favorite vacation spot of Student 1 and Student 2 are the same, 0 if not, 0.5 if similar
Personal_Similarity = J * (1/(WProfession) + K * (1/(WInterests) + L * (WHobbies) + M * (WLanguage) + N * (FCity) + O * (FVS)

In an implementation, student assignments may be performed prior to a designated registration end period (e.g., the last day to register for a course), prior to the start date of the course, etc. In an implementation, suggestions to register for a course may be provided to students not registered for the course to supplement a composition of students already registered to take a course so that each of the student groups that are created may satisfy group criteria for the course (e.g., so that each group may have close to the preferred percentages shown in Table 1 above). As an example, if student groups that satisfy group criteria for a course cannot be created from the current composition of registered students, non-registered students may be provided with such suggestions based on a determination that the addition of those non-registered students to the registered composition would allow student groups that satisfy the group criteria to be created. In one use case, for instance, if student groups created from the current composition are lacking registered students with a particular attribute (e.g., a certain achievement level, a certain race, or other attribute), students that have an interest in the course and have the particular attribute (but have not registered for the course) may be determined, and those students may be provided with a suggestion to register for the course in an effort to end up with a composition of registered students for the course that would allow the "ideal" student groups to be created.

Communication Between an Instructor and Students Based on Student Groups

In an implementation, access to communication channels (e.g., chatrooms or other communication channels) may be enabled for students based on their respective assigned student groups. As an example, communication management subsystem 118 may enable access to a communication channel associated with a student group for a course may be enabled for a student based on the student being assigned to the student group. Responsive to the access being enabled, the student may have access to post messages (e.g., text, multimedia, or other information) on the communication channel, view messages posted by others on the communication channel, view a list of participants currently accessing the communication channel, receive automated messages posted on the communication channel, etc. Such access may, for example, be available to the student before a class session begins, during the class session, or after the class session (e.g., during a predetermined time period before the class session, during a predetermined portion of the class session, during a predetermined time period after the class session, during any time, etc.).

In an implementation, a student that has not been assigned to a particular student group associated with a course may not be given access to a communication channel associated with the student group. In an implementation, no indication of the existence of the particular student group (or other student groups of the same course that the student is not assigned) may be provided by an eLearning platform through which the course is taught. As an example, communication management subsystem 118 may disable, for students not assigned to the student group, access to view a list of participants of the communication channel.

Figure 4:
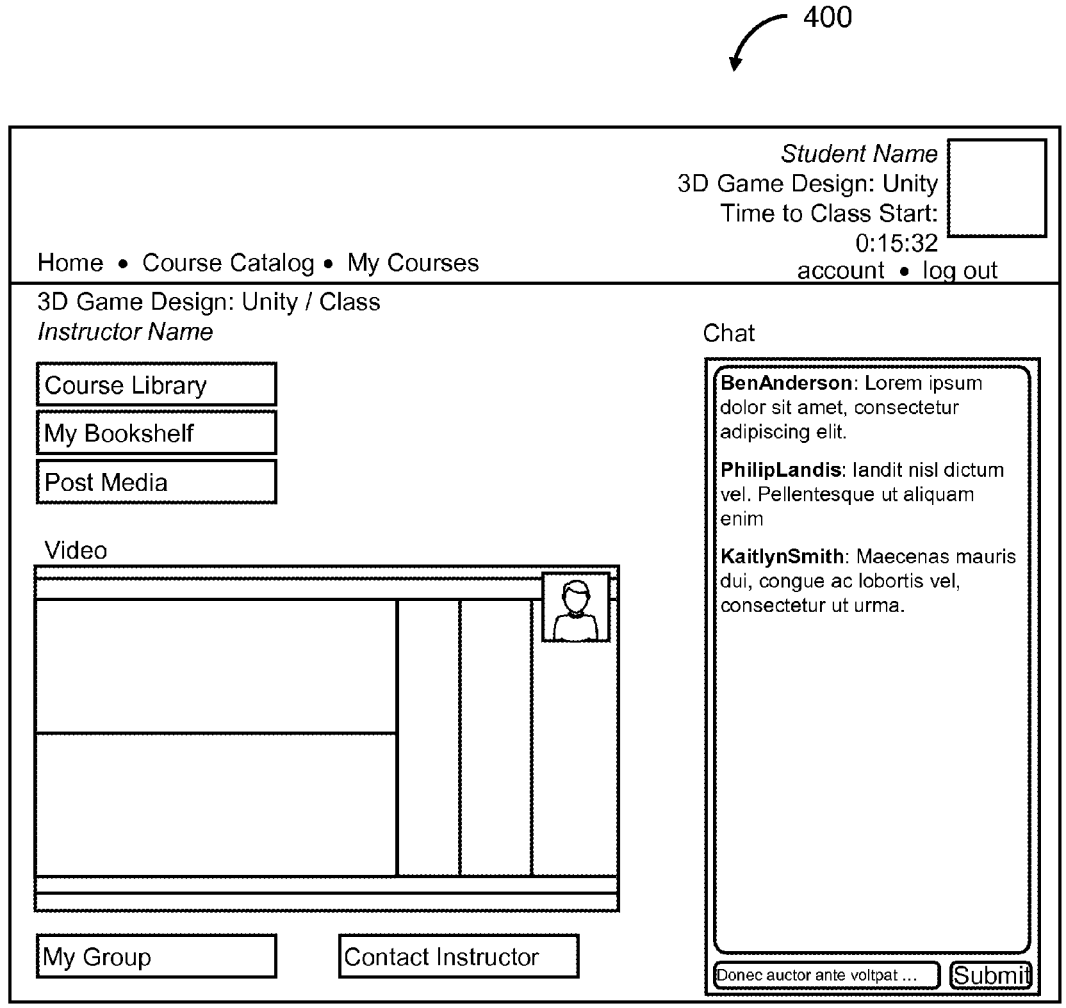
FIG. 4 is an exemplary illustration of a student user interface that enables a user to access content associated with a course and to communicate with an instructor of the course and other students in the user's student group, in accordance with an aspect of the invention.

In one use case, with respect to FIG. 4, a student user interface 400 may be provided for a student registered to take a course. The student user interface may comprise an area in which content streamed from an instructor is rendered (e.g., live face-to-face interactions, broadcasted class material, etc.). The student user interface may also comprise an area in which a chat interface is provided. The chat interface may comprise an input area and an area in which messages from other users (e.g., the instructor of the course and other students assigned to the same student group as the student viewing the message area) are presented. The student utilizing the chat interface may, for example, see a list of participants (e.g., the instructor and other students in the same student group), but other students of the course that are not assigned to the student group may not be able to view the list of participants. As shown in FIG. 4, the student user interface may further present student information (e.g., student's name), course information (e.g., course title), class session information (e.g., time until the class session begins), a link to course material (e.g., a course library), a link to upload content, a link to view students in the same group for the course, a link to contact the instructor, or other items.

In an implementation, communication management subsystem 118 may enable access to communication channels associated with a course for an instructor of the course. Responsive to receiving a request to send a message to a user-selected set of student groups associated with the course, communication management subsystem 118 may provide the message on one or more communication channels accessible to the students assigned to the user-selected set of the student groups. As an example, the instructor may select the set of the student groups (e.g., by selecting the associated set of communication channels), input the message, and submit the message for placement on the communication channels associated with the student groups of the selected set.

In an implementation, communication management subsystem 118 may provide a message (e.g., from an instructor of a course) on multiple communication channels such that students assigned to individual ones of the student groups (to which the communication channels are associated) are presented with the message, but without indicating to any of the student groups that the message is presented (or otherwise accessible) to the other student groups. In this way, among other benefits, each of the student groups may remain "walled off" from the other ones of the student groups associated with the same course to give the appearance of a small class size while taking advantage of the benefits of a large class.

In an implementation, access to interface windows representing different communication channels may be enabled for students, instructors, or other users. In an implementation, communication management subsystem 118 may enable, for an instructor of a course, access to multiple interface windows (e.g., on a chat interface) that each represents a communication channel associated with a particular student group for the course. When a message is provided on a specific one of the communication channels, the message may be provided for presentation on the interface window that represents the specific communication channel. As an example, with respect to FIG. 5, messages provided on the "Group C" chat channel may be presented on the "Group C" interface window of the instructor chat interface (without being presented on the other interface windows that only represent a single chat channel) on user interface 500. An instructor may, for example, select one of the chat interface window tabs (e.g., "Chat with All Groups," "Group A," "Group B," "Group C," "Group D," etc.) to specify on which chat channel(s) a message is to be posted (and, thus, to which student group the message is to be presented), and utilize the input field of the instructor chat interface or one of option buttons (e.g., "Post Media Link," "Post Assignment," "Open for Questions," etc.) to provide the message that is to be posted. If, for example, the instructor selects the "Group C" tab, the message will be posted on the "Group C" chat channel such that the message will be presented on the "Group C" interface window (and on corresponding chat interfaces of students assigned to "Group C"). On the other hand, if the instructor selects the "Chat with All Groups" tab, the message will be posted on all four of the chat channels (e.g., Groups A-D) such that the message will be presented on the "Chat with All Groups," "Group A," "Group B," "Group C," and "Group D" interface windows (and the corresponding chat interfaces of the students in the course).

In an implementation, communication management subsystem 118 may enable, for an instructor of a course, access to an interface window (e.g., on a chat interface) that represents multiple communication channels, each of which is associated with a particular student group for the course. The interface window may represent two or more of the communication channels associated with the student groups for the course (e.g., some or all of the student groups for the course). As an example, messages provided on any one of those communication channels may be presented on the interface window. As another example, duplicate messages provided on those communication channels may be presented as only one message on the interface window.

Figure 5:
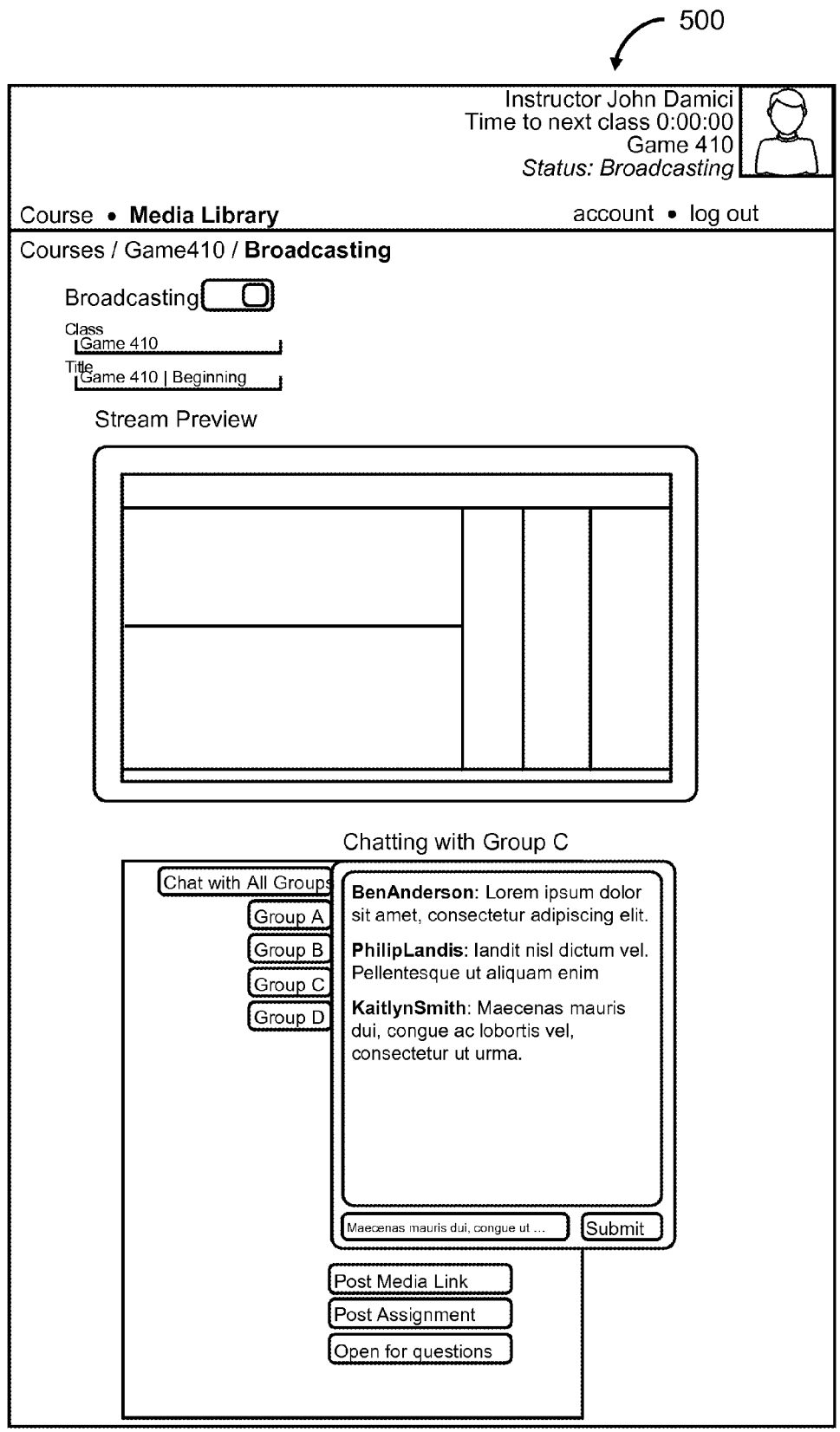
FIG. 5 is an exemplary illustration of an instructor user interface that enables a user to manage content distribution to students of a course and to communicate with the students based on their respective student groups, in accordance with an aspect of the invention.

In one scenario, with respect to FIG. 5, the instructor may select the "Chat with All Groups" chat interface window tab to send a message to the students in all the student groups (e.g., Groups A-D) associated with the course. Upon inputting and submitting the message via the chat interface, the message may be provided as a first message on the "Group A" chat channel, as a second message on the "Group B" chat channel, as a third message on the "Group C" chat channel, and as a fourth message on the "Group D" chat channel. As such, the respective messages (albeit, the same content) will be provided for presentation to the students in all the student groups associated with the course via their corresponding chat interface windows representing the respective chat channels. Although the "Chat with All Groups" chat interface window represents the four chat channels, communication management subsystem 118 may recognize the first, second, third, and fourth messages provided on the four chat channels as being duplicates of one another, and provide only one of the four messages for presentation on the "Chat with All Groups" chat interface window.

Matching of Instructors with Potential Students for a Course

In an implementation, students may be provided with suggestions for a course for which they can register based on instructor information (e.g., instructor/course information 138) comprising attributes of an instructor of the course, course information (e.g., instructor/course information 138) comprising attributes of the course, student information comprising attributes of the students, or other information. As an example, the suggestions may be determined based on a determination of which instructors match the students in their courses of interest or need (e.g., in addition to which available courses match the student's interest).

As an example, registration subsystem 114 may initially obtain instructor information from instructors during a registration process (e.g., to register as an instructor). In one scenario, with respect to FIG. 6, a user may provide one or more inputs to create an instructor account with an eLearning platform via user interface 600. The inputs may, for instance, comprise the user's name (e.g., first name, last name, etc.), a desired password, residential/mailing address (e.g., street address, city, state, zip code, country, etc.), contact information (e.g., phone number, email address, etc.), biological information (e.g., sex, birthdate/age, race, etc.), cultural background information (e.g., race, ethnicity, social economic status, religion, etc.), career information (e.g., current profession or experience, areas of expertise, professional interests, etc.), education information (e.g., current or previous schools attended, current grade level or high grade level completed at the respective schools, graduation years at the respective schools, grade point averages at the respective schools, school majors or degrees received, etc.), personal interest information (e.g., hobbies, favorites, etc.), ability information (e.g., skills, languages known, etc.), legal status information (e.g., military status, marital status, etc.), or other information. The instructor information may then be stored in one or more databases (e.g., learning management database 132).

In a further scenario, with respect to FIGS. 6 and 7, during registration, the instructor may provide inputs related to a course (or courses) that the instructor would like to offer (e.g., via user interfaces 600 and 700). The course-related inputs may, for instance, comprise the course name/title, recommended/preferred student attributes for the course (e.g., course age group, profession, etc.), class session information (e.g., course length, course days/times, etc.), course cost, course requirements (e.g., software requirements, hardware requirements, class/knowledge prerequisites, etc.), course description (e.g., topics covered, goals of the course, etc.), or other information. The course information may then be stored in one or more databases (e.g., learning management database 132).

In an implementation, user-provided "private" information (e.g., provided by the instructor) may be matched and matrixed to "public" information as follows in Table 4A below:

TABLE 3A

| Private | Public |
|---|---|
| Residential Address | Location (e.g., Global Position System (GPS) data) |
| | Local Court House |
| | Purchase Price of House Associated with Residential Address |
| | Current Assessed Value of the House |
| | State Delegate and Senators |
| | Congressional Precincts |
| Zip Code | Nearby Public and Private Schools |
| | Demographic Information |
| Sex | County and Precinct Demographics "Matrixed" with Age (e.g., calculated from birthdate) and Education (e.g., Current School, Grade Level, Major, Highest GPA, Graduation Year, etc.) |
| Race | "Matrixed" with Address, Zip Code, Age, Education, and Employment |
| Employment | Job Market |
| | IRS Salary Ranges |
| | "Matrixed" with Age, Address, Demographic Information, and Education |
| Education (e.g., Current School, Grade Level, Major, Highest GPA, Graduation Year, etc.) | "Matrixed" with Address, Zip Code, Age, Sex, Race, and Employment |
| School or College of Graduation | School Ranking |
| | Tuition Rates |
| | Mascot |
| | Sports Teams |
| Graduation Year | "Matrixed" with Age, Address, and Employment |
| Birthdate | "Matrixed" with Education, Address, Zip Code, Professional Interests, and Hobbies |
| Email | Service Provider |
| | IP Address (at the time of the instructor's data input, e.g., during registration or other process) |
| Mobile Phone | Service Provider |
| Veteran (Brand, Active, Reserve, Dates, etc.) | "Matrixed" with Address, Zip Code, Age, Education, and Employment |

TABLE 3A-continued

| Private | Public |
|---|---|
| Professional Interest/Activities | "Matrixed" with Address, Zip Code, Age, and Education |
| Hobbies | "Matrixed" with Address, Zip Code, Age, and Education |
| Teaching Experience | Years "Matrixed" with Address, Age, Education, Graduation Year, and Employment |
| Area of Expertise | "Matrixed" with Age, Education, School, Graduation Year, and Employment |
| Course Name | "Matrixed" with Education, School, Employment, and Experience |
| Course Age Group | "Matrixed" with Age, Sex, Education, Employment, and Experience |
| Course Days/Time | "Matrixed" with Address, Zip Code, Employment, and Experience |
| Course Cost | "Matrixed" with Education, School, Graduation Year, and Experience |

As an example, each of the data sets above may be divided into three variable groups: Basic (v), Education (t), and Experience (y) where v comprises Address, Birthdate, Sex, Race, Name, etc., t comprises Education, School (or School of Graduation), Graduation Year, etc., and y comprises Teaching Experience, Areas of Expertise, etc. Based on the three variable groups, distinct variable group IDs (v, t, y) may be associated with each instructor. These IDs may be compared with the IDs of students to match instructors with students.

As a further example, the v, t, and y variables (or Matrix variables) may be utilized to determine the similarity (or difference) between instructors and students. In one use case, factors that may be part of the v-Matrix variable may comprise Address, Birthday, Sex, Race, and Name, and associated weights of the r-Matrix variable factors may comprise A, B, C, D, and E, respectively. Similarity (or difference) between an instructor and a student may be calculated as follows in Table 3B below.

TABLE 3B

Dbetween = Distance Between Instructor and Student
Abetween = Age Difference Between Instructor and Student
Csex = 1 if the sex (or gender) of Instructor and Student are the same, 0 if the sex is different
Drace = 1 if the race of Instructor and Student are the same (e.g., 1 = 100%), 0.5 if partially the same, 0 if no similarity, etc.
Whoareyou = 1 if they are the same person (e.g., same name), 0 if not
Basic_Similarity = A * (1/(Dbetween) + B * (1/(Abetween) + C * (Csex) + D * (Drace) + E * (Whoareyou)

In another use case, factors that may be part of the t-Matrix variable may comprise Education, School (or School of Graduation), and Graduation Year, and associated weights of the t-Matrix variable factors may comprise F, G, and H, respectively. Similarity (or difference) between an instructor and a student may be calculated as follows in Table 3C below.

TABLE 3C

WEducation = 1 if Instructor and Student went/goes the same school, 0 if not
WSchool = 1 if the grade levels of Student 1 and Student 2 are equal, 0 if not
WYoG = 1
Education = F * (1/(WEducation) + G * (1/(WSchool) + H * (WYoG)

In a further use case, factors that may be part of the y-Matrix variable may comprise Teaching Experience and Expertise, and associated weights of the y-Matrix variable factors may comprise I and J, respectively. Similarity (or difference) between an instructor and a student may be calculated as follows in Table 3D below.

TABLE 3D

WTeachExp = 1 if the Instructor and the Student have the same profession, 0 if not, 0.5 if similar
WExpertise = 1 if Instructor and Student have the same interests, 0 if not, 0.5 if similar
Experience = I * (1/(WTeachExp) + J * (1/(WExpertise)

In an implementation, instructor/student matching subsystem 120 may match instructors (or their respective courses) to students based on student information and the foregoing obtained instructor or course information. As an example, instructor/student matching subsystem 120 may match an instructor's location (e.g., determined time zone based on the instructor's residential/mailing information), education or professional experience, and areas of expertise to students that reside at a location with a similar time zone, that have at least tangentially similar interest and/or skill sets, or that have other attributes similar to that of the instructor. Upon determining matches, instructor/student matching subsystem 120 may provide suggestions to the students to register for courses offered/taught by instructors with which they match.

In an implementation, suggestions to register for a course may be provided to students not registered for the course to supplement a composition of student already registered to take a course. As an example, if the current composition of registered students does not satisfy a preferred composition of students for the course (e.g., user-selected preferred composition, automated selection of the preferred composition, etc.), non-registered students may be provided with such suggestions based on a determination that the addition of those non-registered students to the registered composition would create a composition that satisfies the preferred composition. In one use case, for instance, if the current composition is lacking registered students with a particular attribute (e.g., a certain achievement level, a certain race, or other attribute), students that have an interest in the course and have the particular attribute (but have not registered for the course) may be determined. Those students may then be provided with a suggestion to register for the course in an effort to end up with a composition of registered students for the course that satisfies the preferred composition.

As an example, Table 4 below provides exemplary preferred compositions of students for a course based on the instructor attributes. The percentages may, for example, represent maximum levels of each student attribute (e.g., high achievers, mid-level achievers, and low achievers statuses determined based on residential information, education information, or other attributes of the students) for a preferred composition in accordance with the instructor's attribute corresponding to the instructor's teaching experience level.

TABLE 4

| Instructors | Preferred Student Composition for a Course | | |
|---|---|---|---|
| Most Experienced | High Achievers: 25% | Mid. Achievers: 40% | Low Achievers: 35% |
| Mid. Experience | High Achievers: 35% | Mid. Achievers: 30% | Low Achievers: 35% |
| New Instructors | High Achievers: 15% | Mid. Achievers: 50% | Low Achievers: 35% |

In one scenario, if an instructor has a "most experienced" status, instructor/student matching subsystem 120 may provide suggestions (to register for a course) based on the preferred composition associated with the "most experienced" status. The suggestions may be provided such that the suggestions are initially provided to a composition of students that match the course and/or the instructor of the course and that reflect the preferred composition (e.g., the composition of students to which the suggestions are initially provided may comprise about 25% that are high achievers, 40% that are mid-level achievers, and 35% that are low achievers). In another scenario, if the current composition of students registered to take a course is lacking high achievers (e.g., less than 25% of the total composition), instructor/student matching subsystem 120 may provide suggestions to students that have not registered for the course and that are high achievers.

Exemplary Flowcharts

Figure 8:
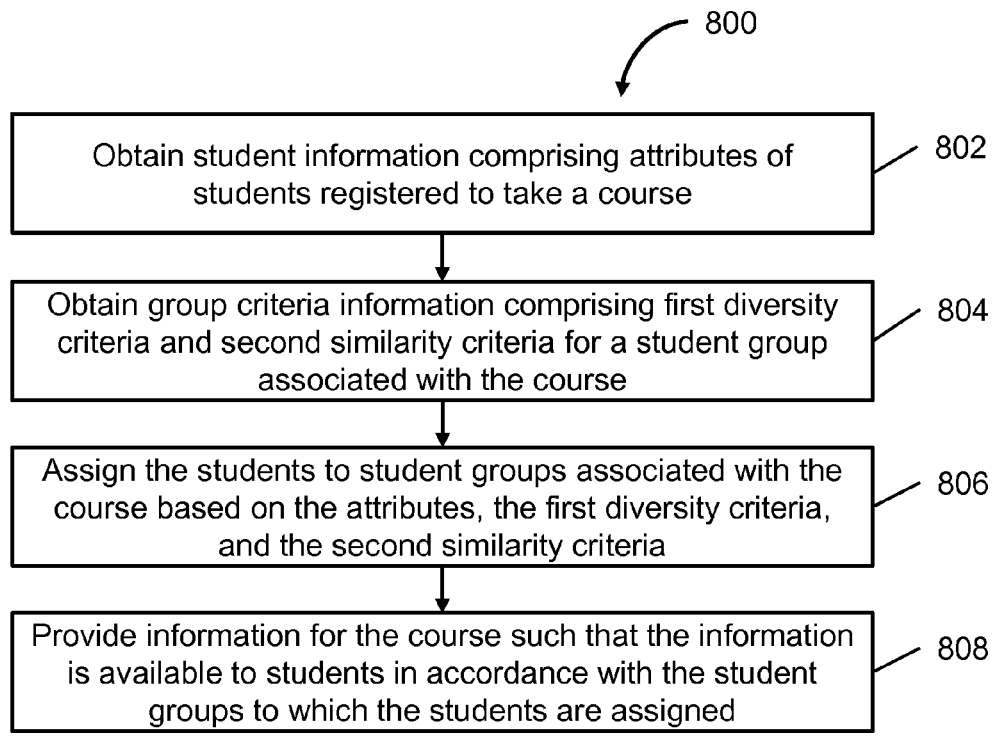
FIG. 8 is an exemplary illustration of a flowchart of a method of providing group learning via computerized student group assignments conducted based on student attributes and student-variable-related criteria, in accordance with an aspect of the invention.
Figure 9:
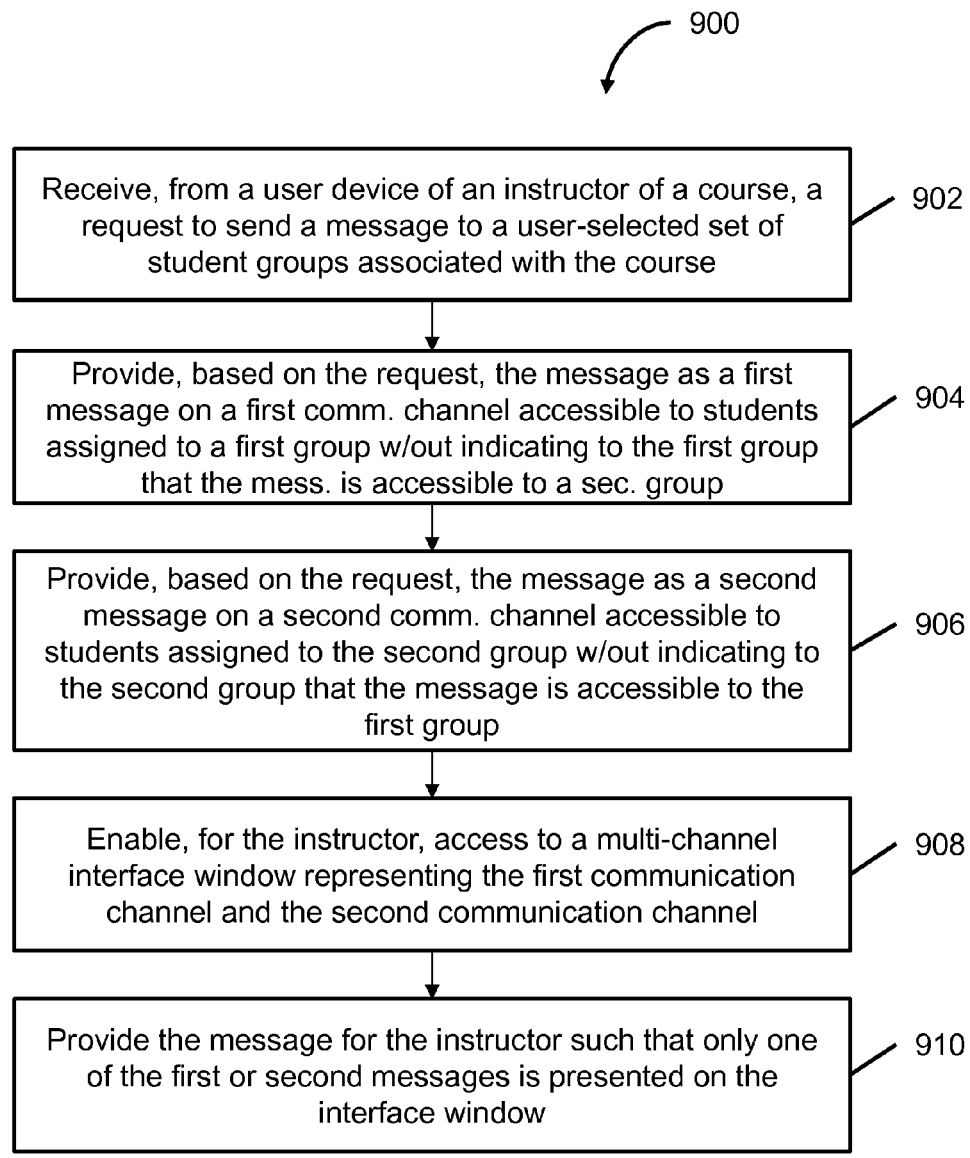
FIG. 9 is an exemplary illustration of a flowchart of a method of providing communication between an instructor of a course and students of the course based on student groups to which the students are assigned, in accordance with an aspect of the invention.

FIGS. 8 and 9 comprise exemplary illustrations of flowcharts of processing operations of methods that enable the various features and functionality of the system as described in detail above. The processing operations of each method presented below are intended to be illustrative and non-limiting. In some implementations, for example, the methods may be accomplished with one or more additional operations not described, and/or without one or more of the operations discussed. Additionally, the order in which the processing operations of the methods are illustrated (and described below) is not intended to be limiting.

In some implementations, the methods may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of the methods in response to instructions stored electronically on an electronic storage medium. The one or more processing devices may include one or more devices configured through hardware, firmware, and/or software to be specifically designed for execution of one or more of the operations of the methods.

FIG. 8 is an exemplary illustration of a flowchart of a method of providing group learning via computerized student group assignments conducted based on student attributes and student-variable-related criteria, in accordance with an aspect of the invention.

In an operation 802, student information about students registered to take a course may be obtained. The student information may comprise attributes of the students that correspond to variables of the students. Operation 802 may be performed by a student management subsystem that is the same as or similar to student management subsystem 112, in accordance with one or more implementations.

In an operation 804, group criteria information associated with the course may be obtained. The group criteria information may comprise first criteria indicating that a student group associated with the course is to be diverse with respect to a first variable of the students, second criteria indicating that a student group associated with the course is to be similar with respect a second variable of the students, or other criteria. Operation 804 may be performed by a group segmentation subsystem that is the same as or similar to group segmentation subsystem 116, in accordance with one or more implementations.

In an operation 806, the students may be assigned to student groups associated with the course based on the attributes, the first criteria, and the second criteria. The students may be assigned such that a student group associated with the course comprises a set of students that, as a whole, is diverse with respect to the first variable and similar with respect to the second variable. Operation 806 may be performed by a group segmentation subsystem that is the same as or similar to group segmentation subsystem 116, in accordance with one or more implementations.

In an operation 808, information for the course may be provided such that the information is available to the students in accordance with the student groups to which the students are assigned. Operation 808 may be performed by a communication management subsystem that is the same as or similar to communication management subsystem 118, in accordance with one or more implementations.

FIG. 9 is an exemplary illustration of a flowchart of a method of providing communication between an instructor of a course and students of the course based on student groups to which the students are assigned, in accordance with an aspect of the invention.

In an operation 902, a request to send a message to a user-selected set of student groups associated with a course may be received from a user device of an instructor of the course. Operation 902 may be performed by a communication management subsystem that is the same as or similar to communication management subsystem 118, in accordance with one or more implementations.

In an operation 904, the message may be provided as a first message on a first communication channel accessible to students assigned to a first student group (of the selected set) without indicating to the first student group that the message is accessible to a second student group (of the selected set). Operation 904 may be performed by a communication management subsystem that is the same as or similar to communication management subsystem 118, in accordance with one or more implementations.

In an operation 906, the message may be provided as a second message on a second communication channel accessible to students assigned to the second student group without indicating to the second student group that the message is accessible to the first student group. Operation 906 may be performed by a communication management subsystem that is the same as or similar to communication management subsystem 118, in accordance with one or more implementations.

In an operation 908, access to a multi-channel interface window representing the first communication channel and the second communication channel may be enabled for the instructor. Operation 908 may be performed by a communication management subsystem that is the same as or similar to communication management subsystem 118, in accordance with one or more implementations.

In an operation 910, the message may be provided for presentation to the instructor such that only one of the first message or the second message is presented on the multi-channel interface window. As an example, the other one of the first message or the second message may be excluded from presentation on the multi-channel interface window based on a determination that the other one of the first message or the second message is a duplicate message. Operation 910 may be performed by a communication management subsystem that is the same as or similar to communication management subsystem 118, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the scope of the appended claims. For example, it is to be understood that the present invention contemplates that, to the extent possible, one or more features of any implementation can be combined with one or more features of any other implementation.

What is claimed is:

1. A system for generating student group assignments based on student attributes and student-variable-related criteria and conducting group learning over a network based on the student group assignments, the system comprising:
    one or more physical processors programmed with computer program instructions which, when executed, program the one or more physical processors to
    obtain student information about students registered to take a course, wherein, for each student, the student information comprises attributes of the student that correspond to variables of the student;
    obtain group criteria information associated with the course, wherein the group criteria information comprises first criteria indicating that the students are to be grouped in a manner that they achieve a target level of diversity with respect to a first variable and second criteria indicating that the students are to be grouped in a manner that they achieve a level of similarity with respect to a second variable;
    assign, based on the attributes, the first criteria, and the second criteria, a first set of the students to a first student group, wherein the first set of the students in the first student group, as a whole, are grouped together to be diverse with respect to the first variable based on the target level of diversity and are grouped together to be similar with respect to the second variable based on the target level of similarity;
    assign, based on the attributes, the first criteria, and the second criteria, a second set of the students to a second student group, wherein the second set of the students in the second student group, as a whole, are grouped together to be diverse with respect to the first variable based on the target level of diversity and are grouped together to be similar with respect to the second variable based on the target level of similarity;
    generate an instructor user interface display;
    provide, through the instructor user interface display, a first display option associated with the first student group, the first display option, when selected, specifies that a first message interface should be displayed on the instructor user interface display, wherein the first message interface display includes one or more first messages exchanged via a first communication channel accessible by the first student group;
    provide, through the instructor user interface display, a second display option associated with the second student group, the second display option, when selected, specifies that a second message interface should be displayed on the instructor user interface display instead of the first message interface, wherein the second message interface display includes one or more second messages exchanged via a second communication channel accessible by the second student group;
    receive a selection of the first display option, and cause the first message interface to be displayed on the instructor user interface display in response to the selection of the first display option; and
    receive a selection of the second display option, and cause the second message interface to be displayed on the instructor user interface display instead of the first message interface display in response to the selection of the second display option.

2. The system of claim 1, wherein the first variable relates to at least one of residential or mailing information, biological information, cultural background information, career information, education information, personal interest information, ability information, or legal status information, and the second variable relates to at least another one of the residential or mailing information, the biological information, the cultural background information, the career information, the education information, the personal interest information, the ability information, or the legal status information.

3. The system of claim 1, wherein the one or more physical processors are further programmed to:
    receive, from a user device of an instructor of the course, a request to send a message to the first student group; and
    provide the message on one or more communication channels accessible to the first set of the students assigned to the first student group.

4. The system of claim 1, wherein the instructor user interface display comprises a third interface window, and wherein the one or more physical processors are further programmed to:
    provide, through the instructor user interface display, a third display option associated with both the first group of students and the second group of students, the third display option, when selected, specifies that a multiple-group message should be provided to at least the first student group and the second student group;
    receive a selection of the third display option, and responsive to the received selection of the third display option:
        provide the multiple-group message on both the first communication channel and the second communication channel;
        display the multiple-group message on the third interface window.

5. The system of claim 1, wherein the first criteria indicates a first preferred number of students having a first attribute corresponding to the first variable and a second preferred number of students having a second attribute corresponding to the first variable.

6. The system of claim 1, wherein at least one of the first criteria or the second criteria is selected for the course by an instructor of the course.

7. The system of claim 1, wherein at least one of the first criteria or the second criteria is automatically selected for the course.

8. The system of claim 1, wherein the one or more physical processors are further programmed to:
   determine that a composition of the students registered to take the course does not satisfy a preferred composition of students for the course; and
   provide, to one or more students not currently registered to take the course, one or more suggestions to register for the course based on Rail the determination that the composition of students registered to take the course does not satisfy the preferred composition and that the addition of the one or more students creates a composition that satisfies the preferred composition.

9. The system of claim 1, wherein to cause the first message interface to be displayed, the computer system is further programmed to:
   cause at least the second display option to continue to be displayed along with the first message interface on the instructor user interface display.

10. The system of claim 9, wherein the computer system is further programmed to
    cause the first display option to continue to be displayed along with the second display option and the first message interface on the instructor user interface display.

11. A method of generating student group assignments based on student attributes and student-variable-related criteria and conducting group learning over a network based on the student group assignments, the method being implemented on a computer system that includes one or more physical processors executing computer program instructions which, when executed, perform the method, the method comprising:
    obtaining, by the computer system, student information about students registered to take a course, wherein, for each student, the student information comprises attributes of the student that correspond to variables of the student;
    obtaining, by the computer system, group criteria information associated with the course, wherein the group criteria information comprises first criteria indicating that the students are to be grouped in a manner that they achieve a target level of diversity with respect to a first variable of the students and second criteria indicating that the students are to be grouped in a manner that they achieve a level of similarity with respect to a second variable of the students;
    assigning, by the computer system, based on the attributes, the first criteria, and the second criteria, a first set of the students to a first student group, wherein the first set of the students in the first student group, as a whole, are grouped together to be diverse with respect to the first variable based on the target level of diversity and are grouped together to be similar with respect to the second variable based on the target level of similarity;
    assigning, by the computer system, based on the attributes, the first criteria, and the second criteria, a second set of the students to a second student group, wherein the second set of the students in the second student group, as a whole, are grouped together to be diverse with respect to the first variable based on the target level of diversity and are grouped together to be similar with respect to the second variable based on the target level of similarity;
    generating, by the computer system, an instructor user interface display;
    providing, by the computer system, through the instructor user interface display, a first display option associated with the first student group, the first display option, when selected, specifies that a first message interface should be displayed on the instructor user interface display, wherein the first message interface display includes one or more first messages exchanged via a first communication channel accessible by the first student group;
    providing, by the computer system, through the instructor user interface display, a second display option associated with the second student group, the second display option, when selected, specifies that a second message interface should be displayed on the instructor user interface display instead of the first message interface, wherein the second message interface display includes one or more second messages exchanged via a second communication channel accessible by the second student group;
    receiving, by the computer system, a selection of the first display option, and causing, by the computer system, the first message interface to be displayed on the instructor user interface display in response to the selection of the first display option; and
    receiving, by the computer system, a selection of the second display option, and causing, by the computer system, the second message interface to be displayed on the instructor user interface display instead of the first message interface display in response to the selection of the second display option.

12. The method of claim 11, wherein the first variable relates to at least one of residential or mailing information, biological information, cultural background information, career information, education information, personal interest information, ability information, or legal status information, and the second variable relates to at least another one of the residential or mailing information, the biological information, the cultural background information, the career information, the education information, the personal interest information, the ability information, or the legal status information.

13. The method of claim 11, further comprising:
    receiving, at the computer system, from a user device of an instructor of the course, a request to send a message the first student group; and
    providing, by the computer system, the message on one or more communication channels accessible to the first set of the students assigned, to the first student group.

14. The method of claim 11, further comprising:
    providing, by the computer system, through the instructor user interface display, a third display option associated with both the first group of students and the second group of students, the third display option, when selected, specifies that a multiple-group message should be provided to at least the first student group and the second student group;
    responsive to a selection of the third display option:
        providing, by the computer system, the multiple-group message on both the first communication channel and the second communication channel;
        displaying, by the computer system, the multiple-group message on the third interface window.

15. The method of claim 11, wherein the first criteria indicates a first preferred number of students having a first attribute corresponding to the first variable and a second preferred number of students having a second attribute corresponding to the first variable.

16. The method of claim 11, further comprising:
  determining, by the computer system, that a composition of the students registered to take the course does not satisfy a preferred composition of students for the course; and
  providing, by the computer system, to one or more students not currently registered to take the course, one or more suggestions to register for the course based on the determination that the composition of students registered to take the course does not satisfy the preferred composition and that the addition of the one or more students creates a composition that satisfies the preferred composition.

17. The system of claim 11, wherein the first display option is predefined for the first group and the second display option is predefined for the second group.

* * * * *

UNITED STATES PATENT AND TRADEMARK OFFICE
CERTIFICATE OF CORRECTION

PATENT NO. : 9,691,291 B2  
APPLICATION NO. : 14/658997  
DATED : June 27, 2017  
INVENTOR(S) : Scott Mckay Martin Page 1 of 1

It is certified that error appears in the above-identified patent and that said Letters Patent is hereby corrected as shown below:

In the Claims

Claim 8, Line 8, (Column 23, Line 11), please rewrite as follows:
-- for the course based on the determination that the --.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*